Jan. 8, 1952 S. B. GRISWOLD ET AL 2,581,528
VEHICLE SUSPENSION
Filed May 4, 1948 2 SHEETS—SHEET 1
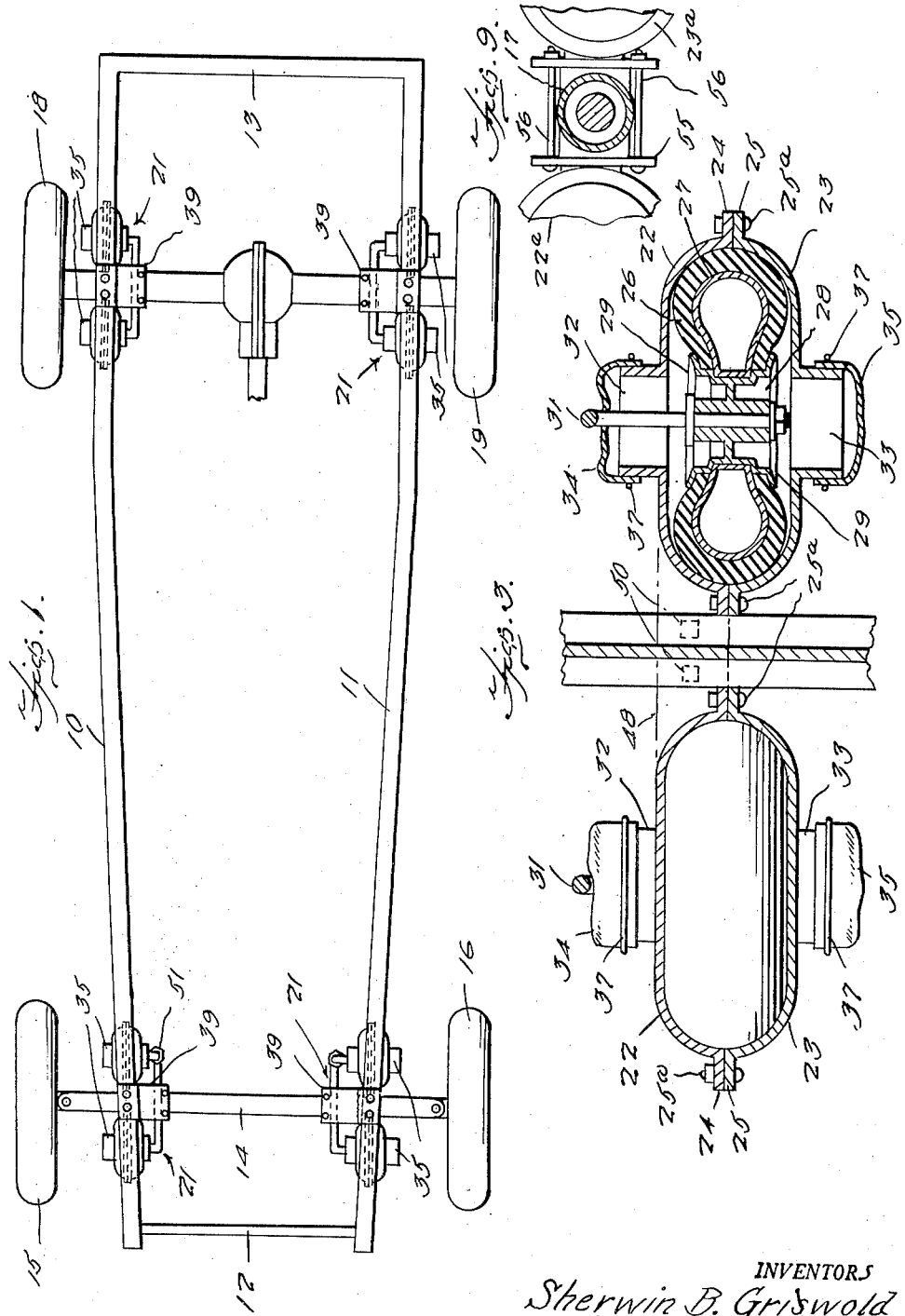
INVENTORS
Sherwin B. Griswold
Dale G. Griswold
BY
McMorrow, Berman & Davidson
ATTORNEYS

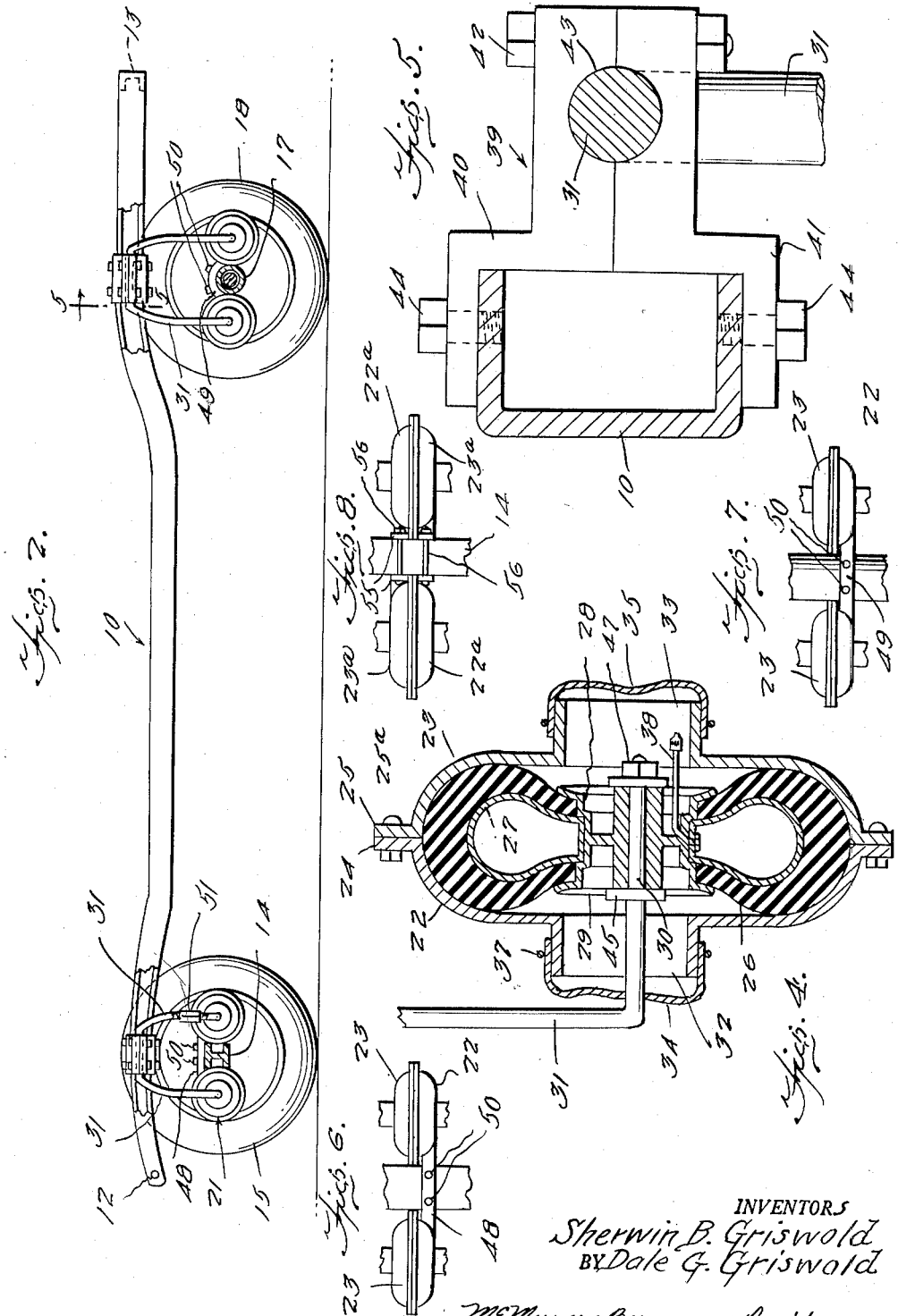

Patented Jan. 8, 1952

2,581,528

UNITED STATES PATENT OFFICE 2,581,528

VEHICLE SUSPENSION

Sherwin B. Griswold and Dale G. Griswold, Newton, Kans.

Application May 4, 1948, Serial No. 24,934

10 Claims. (Cl. 267—65)

This invention relates to mounting or suspension of the frame or chassis of a vehicle, particularly an automobile, on the running gear and more especially to the use of pneumatic cushions whereby the usual heavy and relatively stiff or inflexible metal springs can be eliminated.

An object of this invention is to provide a vehicle pneumatic suspension of the general character herein described which shall embody novel and improved features of construction wherein a pair of pneumatic suspension units may be symmetrically located with respect to the vehicle's axles, directly beneath the longitudinal members of the vehicle frame and cushion shocks from all directions.

Another object is to provide a pneumatic suspension for a vehicle wherein the pneumatic units may be readily removed and replaced with a minimum of effort.

Another object is to provide a pneumatic suspension for a vehicle embodying a two-piece pneumatic unit similar to the casing and tube of an automobile tire.

Another object is to provide a pneumatic suspension for a vehicle including a two-piece casing or housing readily separable for removal or replacement of the pneumatic unit.

Another object is to provide a pneumatic suspension device for a vehicle with means for adjusting the pitch of the axle with which it cooperates.

Another object is to provide a pneumatic suspension for a vehicle embodying means for damping vertical, back-lash, horizontal and lateral motion and thus render a stabilizing action in all directions.

The foregoing and other objects will become apparent from the following description when considered in connection with the accompanying drawings, in which:

Figure 1 is a plan view of a vehicle frame or chassis employing the device of this invention.

Figure 2 is a sectional side elevation of the vehicle frame or chassis showing the pneumatic suspension.

Figure 3 is a fragmentary plan view of a vehicle axle showing the twin or double pneumatic suspension housing and air tube and casing in section.

Figure 4 is a sectional front elevation of the pneumatic suspension device.

Figure 5 is a sectional end elevation of the side channel of the vehicle frame taken along line 5—5 of Figure 2 showing the bracket and rod support for the pneumatic suspension unit.

Figure 6 is a plan view of a front wheel saddle.

Figure 7 is a plan view of a rear wheel saddle.

Figure 8 is a plan view of a modification of the axle saddle.

Figure 9 is an elevational view, partly in section, of the modified axle saddle.

As shown in Figures 1 and 2, an automobile chassis comprising side members 10 and 11, end members 12 and 13, front axle 14, front wheels 15 and 16, rear housing 17 and rear wheels 18 and 19, is provided with twin pneumatic suspension units comprising the complete device generally indicated as 21.

Suspension device 21 consists, as shown in Figures 3 and 4, of a circular housing comprising two similar pieces 22 and 23 provided with flanges 24 and 25 to be bolted 25a or otherwise secured together face-to-face to form a chamber in which may be enclosed a pneumatic tire casing 26 and inflatable tube 27 mounted on tire flange wheel or rim 28. Integral with the housing half 22 is a saddle 48 and 49 (Figures 1, 2, and 3) adapted to rest atop the front axle 14 and rear housing 17 and to be secured thereto by means of studs 50 (Figure 2).

Tire rim or wheel 28 is provided with the usual tire flanges 29, and a center bearing hole 30 for mounting on one end of suspension rod 31.

Housing halves 22 and 23 are similar and provided with hubs 32 and 33 respectively and are covered or closed with dust caps 34 and 35 preferably or flexible material (cap 35 may be of metal) secured to the hub in any suitable manner as, for example, flexible cap 34 may be secured to the hub by means of a spring ring 37.

An air stem and check valve 38 is provided in the tire tube 27 (Figure 4) and so positioned in the tire flange wheel 28 through suitable holes and so located within hub 32, under dust cover 35 as to be protected, out of view and yet readily accessible for inflating the suspension tube 27 with air or other suitable gas.

The loop end of suspension rod 31 is secured in the frame bracket or yoke, generally indicated as 39 in Figure 5, which comprises two sections 40 and 41 secured together by means of a pair of bolts 42 to form a yoke and provided near one end with a hole 43 to accommodate the upper looped portion of suspension rod 31.

The lower or open ends of suspension rod 31 (Figure 4) are bent outwardly at right angles to the plane of the arms threaded and provided with a retaining collar 45, a bearing surface for the tire rim wheel or hub 28, and a securing collar 46 and machine nut 47.

The open ends of the yoke 39 embrace the upper and lower faces or flanges of the longitudinal side members 10 and 11 of the vehicle frame and are secured thereto by means of studs 44 or in any other suitable manner.

As indicated in Figure 2, one of the arms, preferably the rear arm, of the front axle suspension rod 31 is cut intermediate the upper looped portion and the right angled bearing portion and its ends threaded to accommodate a suitable turnbuckle 51 to provide for any desired adjustment of pitch in the front axle.

It will be readily understood that when bracket 39 with suspension rod 31 is secured to the frame members 10 and 11 of a vehicle and housings 22 secured to the axles 14 and 17, shocks in all directions vertical, horizontal and lateral of the vehicle wheel will be absorbed through the resiliency of the surrounding tire casings 26 and tubes 27 in the center of which the tire rims 28, supported by the suspension rods 31, float. The use of a pair of housings 22 secured to the axle and positioned on each side thereof serves to prevent any turning of the axle due to forward or backward motion of the vehicle. It will also be understood that solid tires may be used in place of the casing 26 and tube 27.

In Figures 8 and 9 are shown a modification of the axle and rear housing saddle wherein the casing halves 22a and 23a are each provided on one side with a boss 55 drilled to accommodate bolts 56 which secure the halves 22a and 23a to the axle as indicated for greater strength and to permit the removal or replacement of any of the half casings without disturbing the others.

It is to be understood that various modifications and changes may be made in this invention without departing from the spirit and scope thereof as set forth in the appended claims.

What is claimed is:

1. A vehicle suspension unit comprising a bracket secured to a vehicle frame member, a loop suspension rod provided with two open arms supported at its loop end by said bracket and provided with a turnbuckle for altering the length of one of its said arms, a twin housing secured to the vehicle axle, and resilient means within said twin housing supporting the open ends of the arms of said suspension rod.

2. A vehicle suspension unit comprising a bracket secured to a vehicle frame member, a loop suspension rod provided with two open arms supported at its looped end by said bracket, a twin housing secured to the vehicle axle and arranged forwardly and rearwardly thereof respectively and provided with flanged openings, dust covers for said openings, a tire rim within said housing supporting the open ends of the arms of said suspension rod, and a pneumatic tire on said rim supporting said twin housing and provided with an air stem and valve beneath one of said dust caps.

3. A vehicle suspension unit comprising a loop suspension rod having two arms depending from the vehicle frame and terminating in a pair of rod portions arranged respectively forwardly and rearwardly of the vehicle axle parallel thereto, a bracket comprising complementary members constructed and arranged to embrace said frame and to clamp the bight portion of said loop rod therebetween when the complementary members are secured together, screw fastener means for securing said complementray members together, screw fastener means for securing said complementary members to said vehicle frame, a pair of tire rims respectively mounted concentrically on said pair of rod portions and secured thereto, a pair of pneumatic tires respectively mounted on said tire rims, a pair of identical housings for respectively enclosing said pair of tires, each of said housings comprising complementary members having registering annular flanges, screw fastener means for securing said registering flanges together, a bracket connecting corresponding housing members of the pair of housings together whereby the housings are assembled as a unit when said complimentary members individual thereto are secured together, and screw fastener means for securing said last named bracket to said axle.

4. A vehicle suspension unit comprising a loop suspension rod having two arms depending from the vehicle frame and terminating in a pair of rod portions arranged respectively forwardly and rearwardly of the vehicle axle in spaced parallel relation with respect thereto, a bracket comprising complementary members constructed and arranged to embrace said frame and to clamp the bight portion of said loop rod therebetween when the complementary members are secured together, screw fastener means for securing said complementary members together, screw fastener means for securing said complementary members to said vehicle frame, a pair of tire rims respectively secured to said pair of rod portions concentrically therewith, a pair of pneumatic tires respectively mounted on said tire rims, a pair of identical housings respectively enclosing said pair of tires, each of said housings comprising complementary members having registering annular flanges, screw fastener means for securing said registering flanges together, and a plurality of bolts and nuts therefor for securing said housings to said axle and to each other as a unit, corresponding members of said pair of housings each having a drilled boss for receiving a pair of said bolts above and below said axle respectively whereby said housings are screwed together and to the axle.

5. A suspension unit for supporting a vehicle axle on a vehicle frame comprising a vertically extending inverted U-shaped rod having its bight secured to said vehicle frame and having the free end of each of its legs bent into a horizontal plane, a pair of housings disposed in side by side spaced relation with respect to each other longitudinally of and on opposite sides of said axle and fixedly secured thereto, and resilient means disposed within each of said housings for embracingly receiving and supporting the bent end of the adjacent one of the legs of said rod.

6. A suspension unit for supporting a vehicle axle on a vehicle frame comprising a vertically extending inverted U-shaped rod having its bight secured to said vehicle frame and having the free end of each of its legs bent into a horizontal plane, a pair of housings disposed in side by side spaced relation with respect to each other longitudinally of and on opposite sides of said axle and fixedly secured thereto, resilient means disposed within each of said housings for embracingly receiving and supporting the bent end of the adjacent one of the legs of said rod, and means disposed intermediate the ends of one of said legs and operatively connected thereto for altering the length of said one of said legs.

7. A suspension unit for supporting a vehicle axle on a vehicle frame comprising a vertically extending inverted U-shaped rod having its bight secured to said vehicle frame and having the free end of each of its legs bent into a horizontal plane, a pair of housings disposed in side by side spaced relation with respect to each other longitudinally of and on opposite sides of said axle and fixedly secured thereto, and resilient means disposed within each of said housings for embracingly receiving and supporting the bent end of the adjacent one of the legs of said rod, said resilient means comprising a pneumatic tire casing having its outer periphery engaging the bounding walls of the supporting one of said housings and having its inner periphery operatively connected to said bent end of said adjacent one of said legs.

8. A suspension unit for supporting a vehicle axle on a vehicle frame comprising a vertically extending inverted U-shaped rod having its bight secured to said vehicle frame and having the free end of each of its legs bent into a horizontal plane, a pair of housings disposed in side by side spaced relation with respect to each other longitudinally of and on opposite sides of said axle and fixedly secured thereto, and resilient means disposed within each of said housings for embracingly receiving and supporting the bent end of the adjacent one of the legs of said rod, said resilient means comprising a pneumatic tire casing having its outer periphery engaging the bounding walls of the supporting one of said housings and having its inner periphery operatively connected to said bent end of said adjacent one of said legs, and an inflatable tube disposed within said tire casing and supported therein.

9. A suspension unit for supporting a vehicle axle on a vehicle frame comprising a vertically extending inverted U-shaped rod having its bight secured to said vehicle frame and having the free end of each of its legs bent into a horizontal plane, a pair of housings disposed in side by side spaced relation with respect to each other longitudinally of and on opposite sides of said axle and fixedly secured thereto, resilient means disposed within each of said housings for embracingly receiving and supporting the bent end of the adjacent one of the legs of said rod, and means disposed intermediate the ends of one of said legs and operatively connected thereto for altering the length of said one of said legs, said resilient means comprising a pneumatic tire casing having its outer periphery engaging the bounding walls of the supporting one of said housings and having its inner periphery operatively connected to said bent end of said adjacent one of said legs.

10. A suspension unit for supporting a vehicle axle on a vehicle frame comprising a vertically extending inverted U-shaped rod having its bight secured to said vehicle frame and having the free end of each of its legs bent into a horizontal plane, a pair of housings disposed in side by side spaced relation with respect to each other longitudinally of and on opposite sides of said axle and fixedly secured thereto, resilient means disposed within each of said housings for embracingly receiving and supporting the bent end of the adjacent one of the legs of said rod, and means disposed intermediate the ends of one of said legs and operatively connected thereto for altering the length of said one of said legs, said resilient means comprising a pneumatic tire casing having its outer periphery engaging the bounding walls of the supporting one of said housings and having its inner periphery operatively connected to said bent end of said adjacent one of said legs, and an inflatable tube disposed within said tire casing and supported therein.

SHERWIN B. GRISWOLD.
DALE G. GRISWOLD.

REFERENCES CITED

The following references are of record in the file of this patent:

UNITED STATES PATENTS

| Number | Name | Date |
|---|---|---|
| 1,234,312 | Eberhardt | July 24, 1917 |
| 2,031,862 | Smith | Feb. 25, 1936 |
| 2,086,480 | Smith | July 6, 1937 |